United States Patent
Lamsahel

(10) Patent No.: US 9,379,648 B2
(45) Date of Patent: Jun. 28, 2016

(54) PROCESSOR, DEVICE, METHOD AND COMPUTER PROGRAM TO CONTROL AN EMERGENCY OPERATION OF A MULTI-PHASE ROTATING FIELD MACHINE DURING INTERRUPTION OF A FIRST PHASE CURRENT OF A FIRST PHASE OF THE ROTATING FIELD MACHINE

(71) Applicant: ZF Friedrichshafen AG, Friedrichshafen (DE)

(72) Inventor: Hassan Lamsahel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/528,411

(22) Filed: Oct. 30, 2014

(65) Prior Publication Data

US 2015/0130381 A1 May 14, 2015

(51) Int. Cl.
*H02H 7/08* (2006.01)
*H02P 6/00* (2016.01)
*H02P 29/02* (2016.01)

(52) U.S. Cl.
CPC .............. *H02P 6/002* (2013.01); *H02P 29/022* (2013.01); *H02P 29/023* (2013.01)

(58) Field of Classification Search
CPC ....... H02P 29/022; H02P 29/023; H02P 3/24; H02P 6/002
See application file for complete search history.

(56) References Cited

U.S. PATENT DOCUMENTS

| 8,867,181 B2 | 10/2014 | Hasan et al. | |
|---|---|---|---|
| 2005/0073273 A1 | 4/2005 | Maslov et al. | |
| 2010/0254171 A1* | 10/2010 | Morishita | H02M 7/487 363/71 |

FOREIGN PATENT DOCUMENTS

| WO | WO 2009/007671 | 1/2009 |
|---|---|---|
| WO | WO 2010/004239 | 1/2010 |

OTHER PUBLICATIONS

German Search Report, Dec. 2, 2013.

* cited by examiner

*Primary Examiner* — Karen Masih
(74) *Attorney, Agent, or Firm* — Dority & Manning, P.A.

(57) ABSTRACT

Embodiments relate to a processor for controlling an emergency operation of a multiphase induction machine upon an interruption of a first phase current of a first phase of the induction machine. The processor is designed to determine a control current setting, corresponding to the emergency operation, for a second phase of the induction machine in a coordinate system fixed to the stator through a combination of a first target current setting, corresponding to a normal operation of the electric engine, for the first phase and a second target current setting for the second phase in a coordinate system fixed to the stator. This distinguishes a phase angle and an amplitude of the control current setting for the second phase from a phase angle and an amplitude of the second target current setting.

14 Claims, 11 Drawing Sheets

PROCESSOR, DEVICE, METHOD AND COMPUTER PROGRAM TO CONTROL AN EMERGENCY OPERATION OF A MULTI-PHASE ROTATING FIELD MACHINE DURING INTERRUPTION OF A FIRST PHASE CURRENT OF A FIRST PHASE OF THE ROTATING FIELD MACHINE

FIELD OF THE INVENTION

This invention is in the field of the control of an emergency operation of a multiphase induction machine upon an interruption a first phase current of a first phase of the induction machine.

BACKGROUND

In order to convert electrical energy into kinetic energy, in addition to other structural forms of electric motors, so-called "induction machines" or "three-phased machines" are used. Induction machines may include a stator with a ring-shaped arrangement of so-called "phases," which can generate temporally variable magnetic fields, and thereby can set into rotation a magnetic rotor, for example, an armature with a permanent magnet. Induction machines, for example, permanent magnet synchronous machines (PSM) or asynchronous machines (ASM), are employed in various applications, such as hybrid cars, electric cars, servo drives, machine tools, etc. With such induction machines, intermediate voltage circuit inverters (WR) are frequently used for the generation of supply voltages for the individual phases. Upon an error in the machine or in the inverter, one of the phases of the machine can be interrupted. If the machine continues to operate, this may lead to fluctuations in the turning moment. The document WO 2010/004239 A1 discloses a method in which a synchronous machine with several phases may continue to be operated even upon the failure of a phase. In doing so, however, in some operating cases of the machine, the phase currents can be very large, such that damages to the machine may arise, for example damages to the semiconductor components found in the inverter that are used to govern the voltages for the remaining phases.

In some applications, the machine may be switched off in the event of an error. Welchko, Jahns & Lipo (IEEE Power Electronics Letters, Vol. 2, No. 4, December 2004) disclose a method for the interruption of phase currents upon the occurrence of an error in synchronous machines with permanent magnets. This approach may be undesirable in some applications, for example, for a steering system or an electric car, since a sudden switching off of the engine in a vehicle requires the attention of the vehicle's driver, and this may result in accidents.

In order to be able to continue to put the machine in operation upon the event of a failure and the phase interruption that arises from this, in the alternative, a redundancy in the inverter or in lines of the machine may be used. However, these solutions may bring about additional complexity, additional volume and high costs. This may be impractical in a provided installation in a vehicle, as often only little space is available here, and, with greater quantities produced, the additional high costs can multiply.

As such, it is desirable to create an improved concept for controlling an induction machine, such as a PSM, upon the failure of one phase.

SUMMARY OF THE INVENTION

Additional objects and advantages of the invention will be set forth in part in the following description, or may be obvious from the description, or may be learned through practice of the invention.

A processor, a device, a method and a computer program take into account this need to control an emergency operation of a multiphase induction machine upon an interruption of a first phase current of a first phase of the induction machine in accordance with the aspects of the invention.

Embodiments enable this by using a processor for controlling an emergency operation of a multiphase induction machine upon an interruption of a first phase current of a first phase of the induction machine. Thereby, the processor is designed to determine a control current setting, corresponding to the emergency operation, for a second phase of the induction machine in a coordinate system fixed to the stator. This occurs through a combination of a first target current setting, corresponding to a normal operation of the electric engine, for the first phase and a second target current setting for the second phase in a coordinate system fixed to the stator. This distinguishes a phase angle and an amplitude of the control current setting for the second phase from a phase angle and an amplitude of the second target current setting. In this manner, excessive currents, which may cause damage to the induction machine or an inverter used to govern the currents, can be avoided. In addition, redundancies in the inverter or the machine may possibly be omitted. Moreover, the possible complete switching off of the machine in the event of an error can be avoided.

In accordance with some embodiments, the control current setting may at least partly compensate for the first target current setting for the first phase. Several control current settings for several additional phases may also exist, such that the target current setting for the first phase is fully compensated by the control current settings for the additional phases in total. Thus, depending on the phase number and construction type of the machine, the target current setting for the first phase may be redirected to one or more control current settings for the additional phases.

In accordance with some embodiments, the control current setting may correspond to a sum of the value of the second target current setting and half of the value of the first target current setting. This may bring about, for example, a good compensation of the target current setting for the first phase, if the induction machine comprises a three-phase induction machine. Thereby, each of the two control current settings for the second phase and a third phase may be extended by half of the value of the target current setting for the first phase.

In accordance with some embodiments, an amplitude of the control current setting may be less than an amplitude of the second target current setting. Thus, the amplitude of an individual phase current assuming excessive values can be avoided, in order to, for example, maintain a turning moment prevailing prior to the failure of the first phase, without an overload of the machine following this. Expensive and sensitive components, such as semiconductor components like MOSFETs, can be protected from damage.

In accordance with some embodiments, the frequency of the control current setting essentially may correspond to the frequency of the second target current setting. Thereby, the rotational speed of the induction machine after the interruption of the first phase current essentially may correspond to the rotational speed of the induction machine prior to the interruption of the first phase current. This may be useful, for example, for electric vehicles, if a motor is to continue running with constant speed after an error.

In accordance with some embodiments, the processor may include an output interface for a signal with the control current setting. Thereby, the signal may bring about an operation of the induction machine with the control current setting.

Embodiments also relate to a device for the control of an emergency operation of a multiphase induction machine upon an interruption of a first phase current of a first phase of the induction machine. The device is coupled to a signal input. The device is designed to receive a control current setting for a second phase current of a second phase of the induction machine in a coordinate system fixed to the stator. The device also includes a comparator. The comparator is designed to provide a control signal to an inverter based on a comparison of the control current setting and an actual value of the second phase current. The control signal brings about, upon a first comparison result, the generation of a first supply voltage value, and, upon a second comparison result, the generation of a second supply voltage value for the second phase. If an error occurs, the emergency operation may be initially determined directly through an error signal. In addition, a control of active remaining phases may be undertaken while taking into account an applied phase current; this may improve the accuracy of the control current settings.

In accordance with some embodiments, the first comparison result may be obtained if a difference between the control current setting and the actual value of the second phase current is less than a threshold value. Accordingly, the second comparison result may be obtained if the difference between the control current setting and the actual value of the second phase current is greater than the threshold value.

With some of the preceding embodiments, the threshold value may be a first value if the difference is greater than 0, and a second value if the difference is less than 0. Thus it may be possible for some embodiments to carry into effect a hysteresis behavior, with which, instead of a discrete threshold value, a tolerance range exists, in which, in principle, both comparison results can be obtained, for example depending on whether a change to the comparison value currently corresponds to an increase or a decrease of the same. This may be useful if a prolonged persistence of the comparison result within the tolerance range is to be expected.

In accordance with some embodiments, the inverter may include at least one first power semiconductor connected to the second phase and a second power semiconductor connected to the second phase. Thereby, the first comparison result may bring about the switching on of the first power semiconductor and the switching off of the second power semiconductor. Accordingly, the second comparison result may bring about a switching off of the first power semiconductor and a switching on of the second power semiconductor. Thus, it may be ensured that, for example, two power semiconductors, which are assigned to the same phase, are switched on at the same time, as a simultaneous switching on may lead to a short circuit.

In accordance with some embodiments, the device may also include at least one additional comparator. In addition, a first comparator may be assigned from the plurality of comparators of the first phase, and a second comparator may be assigned from the plurality of the comparators of the second phase. Thus, the control process described above may be transferred to several or even all phases in the machine that are still running without any errors.

In accordance with some embodiments, the first comparator may be deactivated upon a failure of the first phase. This may ensure that the failed first phase displays a temporally constant behavior, or in other words, that there is no uncontrolled current flow. This may simplify additional processes, and prevent unwanted interference or damage to components.

In addition, embodiments relate to a method for controlling an emergency operation of a multiphase induction machine upon an interruption of a first phase current of a first phase of the induction machine. The method comprises a combination of a first target current setting, corresponding to a normal operation of the electric engine, for the first phase and a second target current setting for the second phase for the coordinate system fixed to the stator. In addition, the method comprises a determination of a control current setting corresponding to the emergency operation for a second phase of the induction machine in a coordinate system fixed to the stator. The determination takes place through the combination of the first target current setting, corresponding to a normal operation of the electric engine, for the first phase and the second target current setting for the second phase for the coordinate system fixed to the stator. This distinguishes a phase angle and an amplitude of the control current setting for the second phase from a phase angle and an amplitude of the second target current setting. As a result, an implementation of redundancies in the inverter or the machine may be omitted. Thus, it may also be no longer necessary to switch off the machine altogether; rather, the machine may continue to be operated at least with a part of the original performance.

Embodiments also relate to a program with a program code for carrying out the method, if the program code is executed on a computer, a processor or a programmable hardware component.

BRIEF DESCRIPTION OF THE DRAWINGS

Additional advantageous arrangements are more specifically described below on the basis of embodiments shown in the drawings, but are not limited to the embodiments. The following is shown.

DETAILED DESCRIPTION

Figure 1:
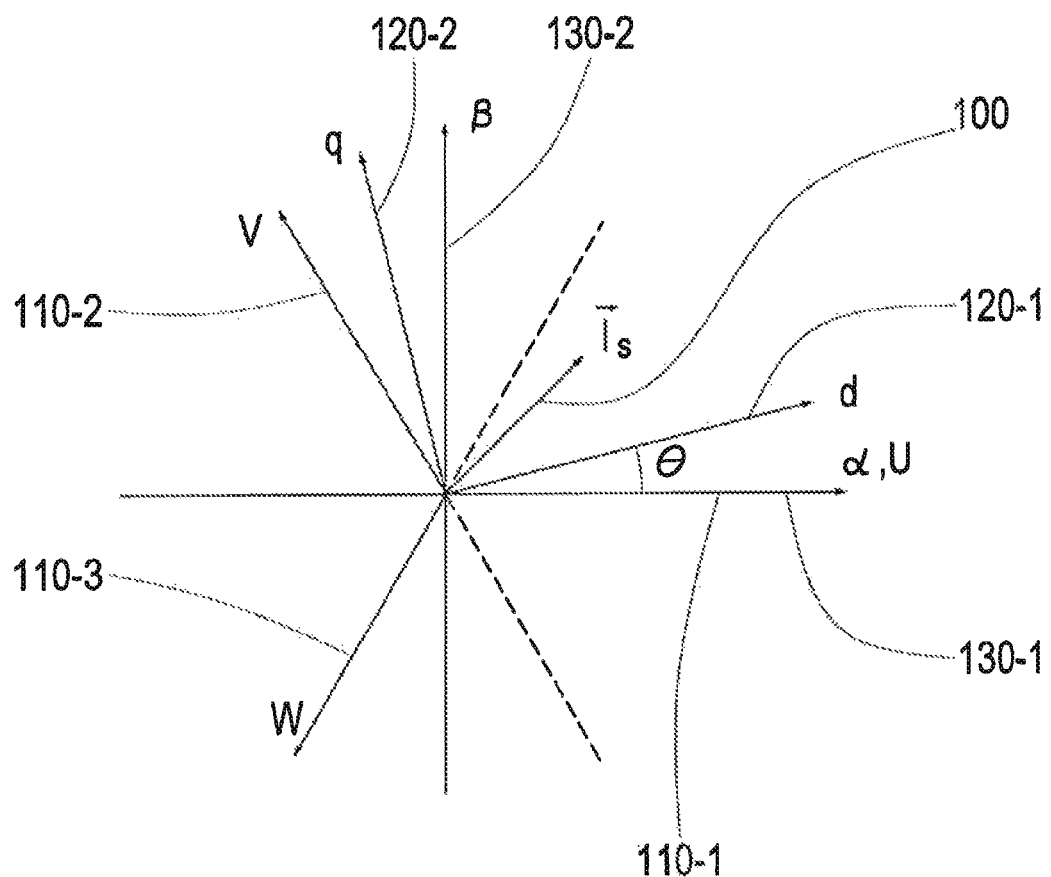
FIG. 1 is an illustration of the different coordinate systems, which may be used to determine the variables relevant to the field-oriented control.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Various embodiments will now be described in detail with reference to the attached drawings, in which a few embodiments are shown. For clarity's sake, the thickness dimensions of lines, layers and/or regions can be exaggerated in the figures.

In the following description of the attached figures, which only show a few exemplary embodiments, the same reference signs designate the same or comparable components. In addition, summarizing reference signs are used for components and objects, which occur several times in one embodiment or one drawing, but are described together with regard to one or more characteristics. Components or objects that are described with the same or summarizing reference signs may be equal in respect of individual, several or all characteristics, for example regarding their dimensioning, but if applicable may also be executed separately, to the extent that nothing else explicitly or implicitly arises in the description.

Although embodiments can be modified or altered in various manners, embodiments in the figures are presented as examples and described therein in detail. However, it must be clarified that there is no intention to limit embodiments to each of the disclosed shapes; rather, embodiments are to cover all functional and/or structural modifications, equivalents and alternatives that lie in the area of the invention. The same reference signs designate the same or similar elements in the entire figure description.

It should be noted that one element that is designated as "connected" or "coupled" to another element may be directly connected or coupled to the other element, or intermediary elements may be present. By contrast, if an element is designated as "directly connected" or "directly coupled" to another element, no intermediary element is present. Other terms that are used to describe the relationship between elements are to be interpreted in a similar manner (for example, "between" compared to "directly in between," "adjacent to" compared to "directly adjacent to," etc.).

The terminology used herein only serves the purpose of describing certain embodiments, and is not to be limited to the embodiments. As used herein, the singular forms of "a" and "the" also include the plural forms, to the extent that the context does not clearly indicate something else. It also must be clarified that expressions such as, for example, "includes," "including," "features" and/or "featuring," as used herein, indicate the presence of certain characteristics, integral numbers, steps, work processes, elements and/or components, but this does not exclude the presence or the addition of one or several characteristics, integral numbers, steps, work processes, elements, components and/or groups.

Unless otherwise defined, all terms used herein (including technical and scientific terms) have the same meaning attached to them by an average specialist in the field to which the embodiments belong. It must also be clarified that certain expressions, such as those that are defined in commonly used dictionaries, are to be interpreted in such a manner that they would have the meaning that is consistent with their meaning in the context of the relevant technology, and are not to be interpreted in an idealized or an overly formal sense, to the extent that they are not expressly defined herein.

An induction machine may be designed as a permanent magnet synchronous machine (PSM machine). The PSM machine may include a stator, which may be constructed from a ring-shaped arrangement with 120°-distributed coils (also designated as a phase), to the extent that it is a three-phase machine. The phases can generate temporally variable magnetic fields, and, for example, can set into rotation an armature with one permanent magnet or one permanent magnet mounted on the armature.

For the sake of completeness, FIG. 1 provides an overview of three coordinate systems of a three-phase machine, which may be used for a calculation or a description of any phase current vector 100. A three-coordinate system (UVW) with the associated axes 110-1, 110-2 and 110-3 corresponds to a coordinate system that is indicated by the individual coils of the stator. For a control of the machine or the electric motor, state variables, for example a phase current, can be transformed into a coordinate system rotating with the rotor, the d, q coordinate system. The d-axis 120-1 runs parallel to the maximum magnetic flux of the permanently excited armature, and the q-axis 120-2 runs perpendicular to this.

Furthermore, the variables may also be described in a two-dimensional Cartesian coordinate system, the $\alpha,\beta$ coordinate system, whereas, in the presentation shown in FIG. 1, without any limitation of the generality, the $\alpha$ axis 130-1 is selected in such a manner that these run identically to the U axis 110-1 of the U, V, W coordinate system. The $\beta$ axis 130-2 runs perpendicular to this.

With the field-oriented control (FOR) more specifically described in the further curve, the state variables of the electric motor are transformed into the d,q coordinate system, since, in these coordinates, the differential equations that describe the dynamic behavior of the electric motor are simplified. In these coordinates, the machine may be controlled in a manner similar to a direct current machine.

Figure 2:
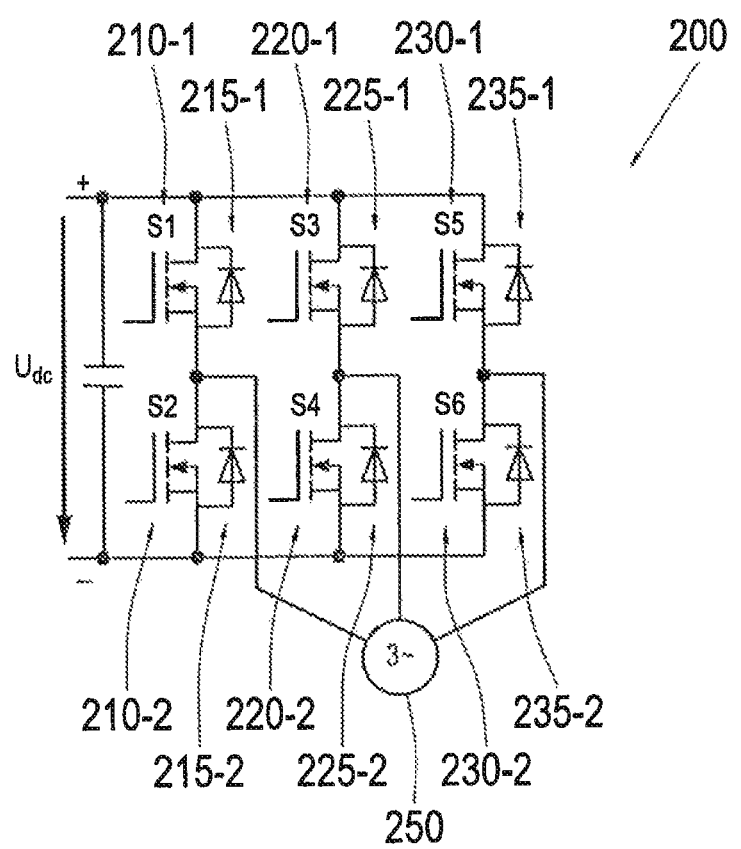
FIG. 2 is a comparative example of an inverter, which may be used as a voltage source for an electric motor.

As an example of a voltage supply for a three-phase induction machine 250, in FIG. 2, an inverter 200 with MOSFETs 210-X, 220-X and 230-X is shown, whereas X=1; 2. With the MOSFETs 210-X, 220-X and 230-X, the current may be switched through in both directions. Additional embodiments may also use other semiconductors, for example, IGBTs (insulated gate bipolar transistors) or GTOs (gate turn-off thyristors). Only during the blocking period between the upper MOSFET 210-1, 220-1 and 230-1 and the lower MOSFET 210-2, 220-2 and 230-2, in each phase x (U, V or W), do the return diodes 215-1; 225-1 and 235-1 or 215-2; 225-2 and 235-2, as the case may be, accept the current in this phase x. Depending on the sign of the current, the current may be led through the lower diode (such as 215-2) or the upper diode (such as 215-1). The upper MOSFET (such as 210-1) or the upper diode (such as 215-1), as the case may be, of a phase x is always connected to $+U_{dc}$, and the lower MOSFET (such as 210-2) or the lower diode (such as 215-2) is always connected to $-U_{dc}$.

With the intermediate voltage circuit inverter 200 shown in FIG. 2, through different modulation techniques, the desired voltages (such as for an induction machine) are adjusted to its output. An undershoot vibration technique, pulse-width modulation (PWM) or space vector modulation are often used as the modulation technique.

In normal operation, field-oriented control (FOR) is used for the control of a permanent magnet synchronous machine (PSM). A current sensor is used for current measurement in each phase. For a better understanding, on the basis of FIG. 3, the general approach for the FOR is briefly described below on the basis of a block diagram of a FOR regulator 300. As reference variables 302-1 and 302-2, this receives target current settings for the d components 302-1 and the q components 302-2 of the current in the d,q coordinate system, in order to indicate a desired rotational speed and a desired rotational torque of the electric engine, more precisely the induction machine 250. The control deviation is determined by subtracting the actual d components 304-1 and the actual q components 304-2 by the target current setting. The d components 304-1 and the q components 304-2 together give rise to the option of providing a feedback signal 305, which contains information regarding a current in each of plurality of phases. The control deviation of each component of the current is processed by a proportional integral (PI) regulator 306-1 or 306-2, which generate as regulating variables 308-1 and 308-2 a first voltage component 308-1 ($U_{sd}$) and a second voltage component 308-2 ($U_{sq}$), thus a desired voltage vector in the d,q coordinate system. Since, for the operation of the electric motor 250, a voltage for each phase must be generated and such voltages are present in the stationary coordinate system, a d, q/1, 2, 3 converter 310 is used to transform the regulating variables 308-1 and 308-2 or the voltages to be adjusted in the three-coordinate system (thereby, the coordinates 1, 2 and 3 may correspond to the coordinates U, V and W used in FIG. 1), in order to receive the voltage settings 312-1 ($U_{s1}$), 312-2 ($U_{s2}$) and 312-3 ($U_{s3}$).

A vector modulator or PWM generator 314 is used to generate, from the voltage vector in the fixed coordinate system, control signals for a pulse inverter 316 or for a power amplifier. One example of an inverter was already shown in FIG. 2. In particular, for each of the phases U, V and W, the vector modulator 314 generates a pulse-width modulated signal 318-1 to 318-3, by means of which the individual phases of the inverter 316 are controlled. The generated PWM values from the governing or the control for generating a determined voltage vector may change with the desired voltage frequency and amplitude. The variables of the voltage amplitude may be a measure of the length of the supplied voltage vector on the inverter.

The supply voltages 320-1 to 320-3 ($U_u$, $U_v$, $U_w$) are present at the output of the inverter; these are applied at each of the coils of the different phases. The current flowing into the supply lines of the operating voltage 320-1 to 320-3 is measured and used as a return or feedback signal of the control loop. Since, with the field-oriented control, the target current or the reference variable is present in the d,q coordinate system, the currents are transformed into the three supply lines by means of a converter 324 in the d,q coordinate system, where the feedback signal 305 can be directly used.

Figure 3:
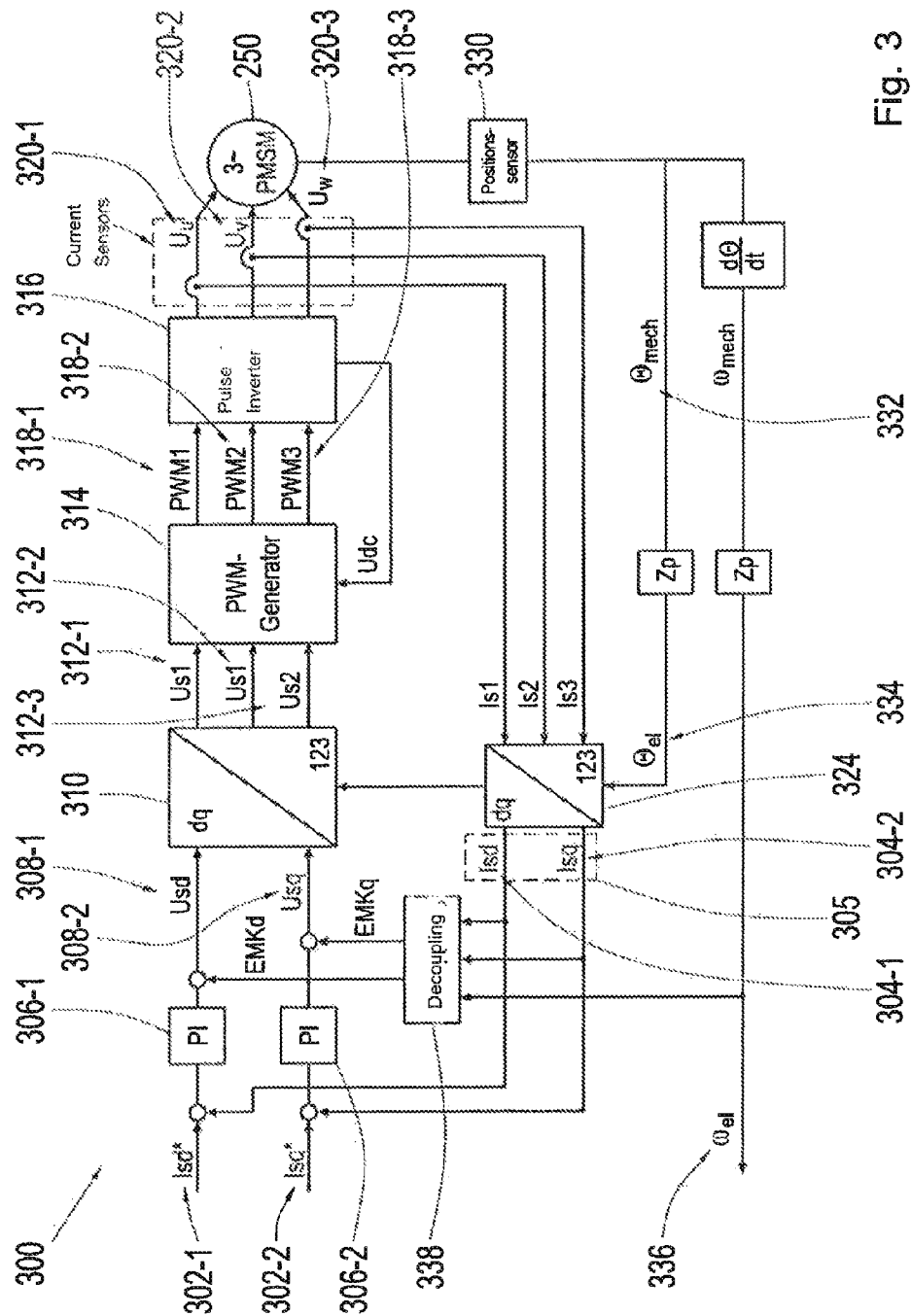
FIG. 3 is a comparative example for a control loop for the field-oriented control of a permanent magnet synchronous motor.

In order to enable the transformation of the U, V, W coordinate system into the d,q coordinate system, information regarding the position of the armature is also required. For this purpose, using an angle sensor or a position sensor 330, the mechanical angle 332 ($\theta_{mech}$) may be determined and made available to the system. From the mechanical angle 332, the electrical angle 334 ($\theta_{el}$) can be determined, for example by multiplying it with the number of pole pairs Zp; this is required for the transformation from the d,q coordinate system into the U, V, W coordinate system and back. The so-called "electrical angular velocity" 336 ($\omega_{el}$) may be determined in the same manner. FIG. 3 shows the additional possibility of taking into account reciprocal effects between the d components and the q components of the current by means of a decoupler 338, whereas this functionality is not more specifically described herein, primarily for reasons of clarity.

Figure 4:
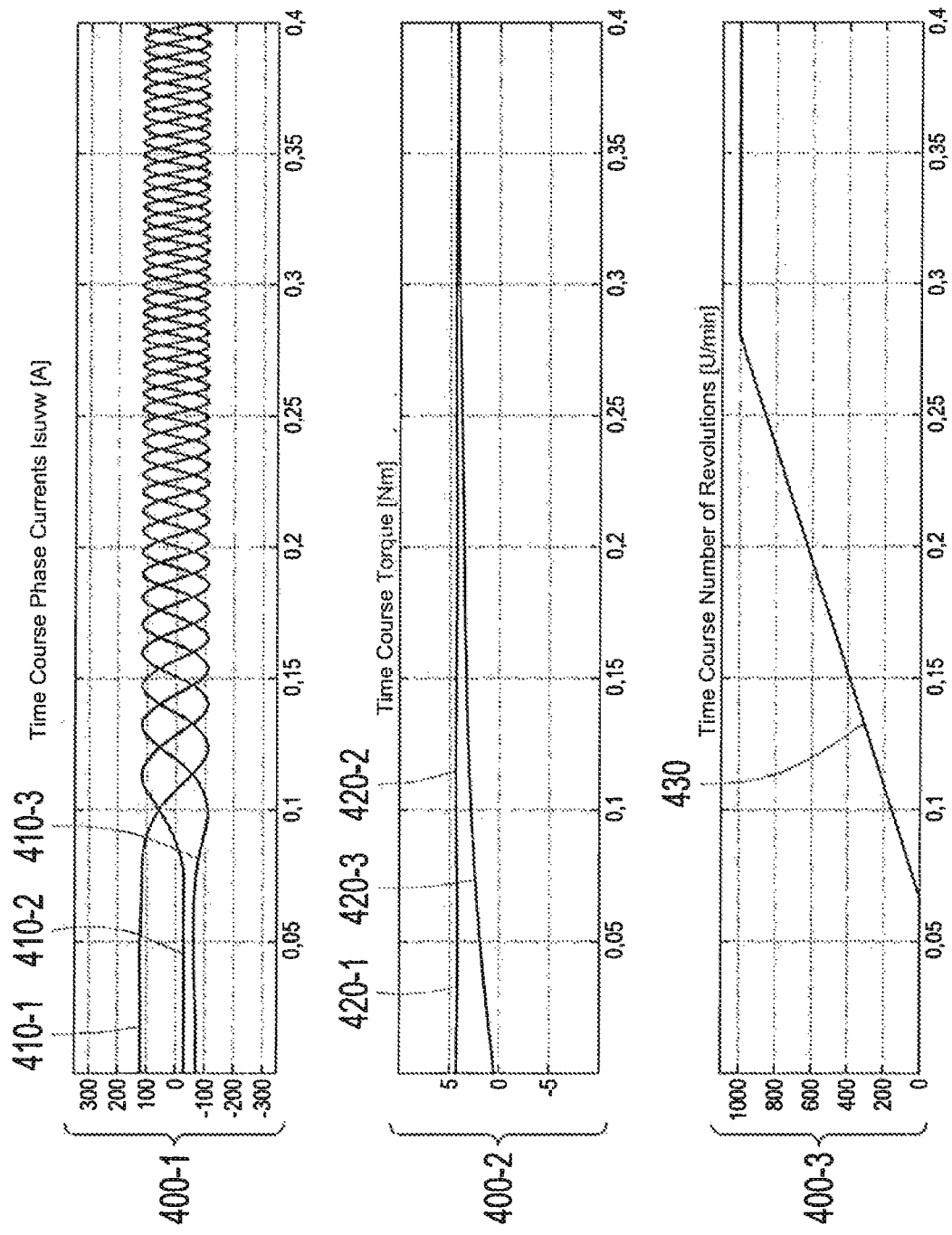
FIG. 4 is a curve of phase currents of three phases, a turning moment and a rotational speed over time upon a normal operation of an induction machine.

FIG. 4 shows the ideal curve of the phase currents (see the phase currents Is1, Is2, Is3 in FIG. 2) and of the turning moment upon an acceleration of the machine from 0 to 1000 revolutions per minute (rpm). In the upper graphic 400-1, the amplitude value of the phase currents in amperes (A) is plotted against time in seconds (s). Each of the U current 410-1, the V current 410-2 and the W current 410-3 are phase-shifted at 120° to each other, and, over the entire time curve, show the same maximum amplitude of approximately 100 A. Thereby, the frequencies of the currents 410-1 to 410-3 increase in the same amount, until the final rotational speed of 1000 rpm is reached.

The middle graphic 400-2 shows a curve of the corresponding turning moment in Newton meters (nm), plotted against time. Thereby, the target value 420-1 coincides in good approximation with the actual value 420-2, since the forces generating the turning moment may be effective as soon as a desired voltage is applied to the individual phases. In addition, a filtered turning moment 420-3 is plotted against time. Due to the constant actual value of the turning moment 420-2, a uniform acceleration takes place. This may be taken from the uniformly increasing rotational speed 430, as the lower graphic 400-3 shows. The rotational speed of 1000 rpm is reached after 0.28 seconds.

Upon an error in the machine or in the inverter, one of the three phases of the machine may be interrupted. Possible causes may be, for example, a failure of one or two MOSFETs of the inverter in a phase, or contact problems between the inverter and the machine. As a result, it may be possible that the machine cannot be correctly governed, because the desired voltage vector—based on the failure of a phase—cannot be adjusted. In this manner, an alternating field instead of a rotating field may arise in the machine, which may lead to fluctuations in the turning moment.

Figure 5:
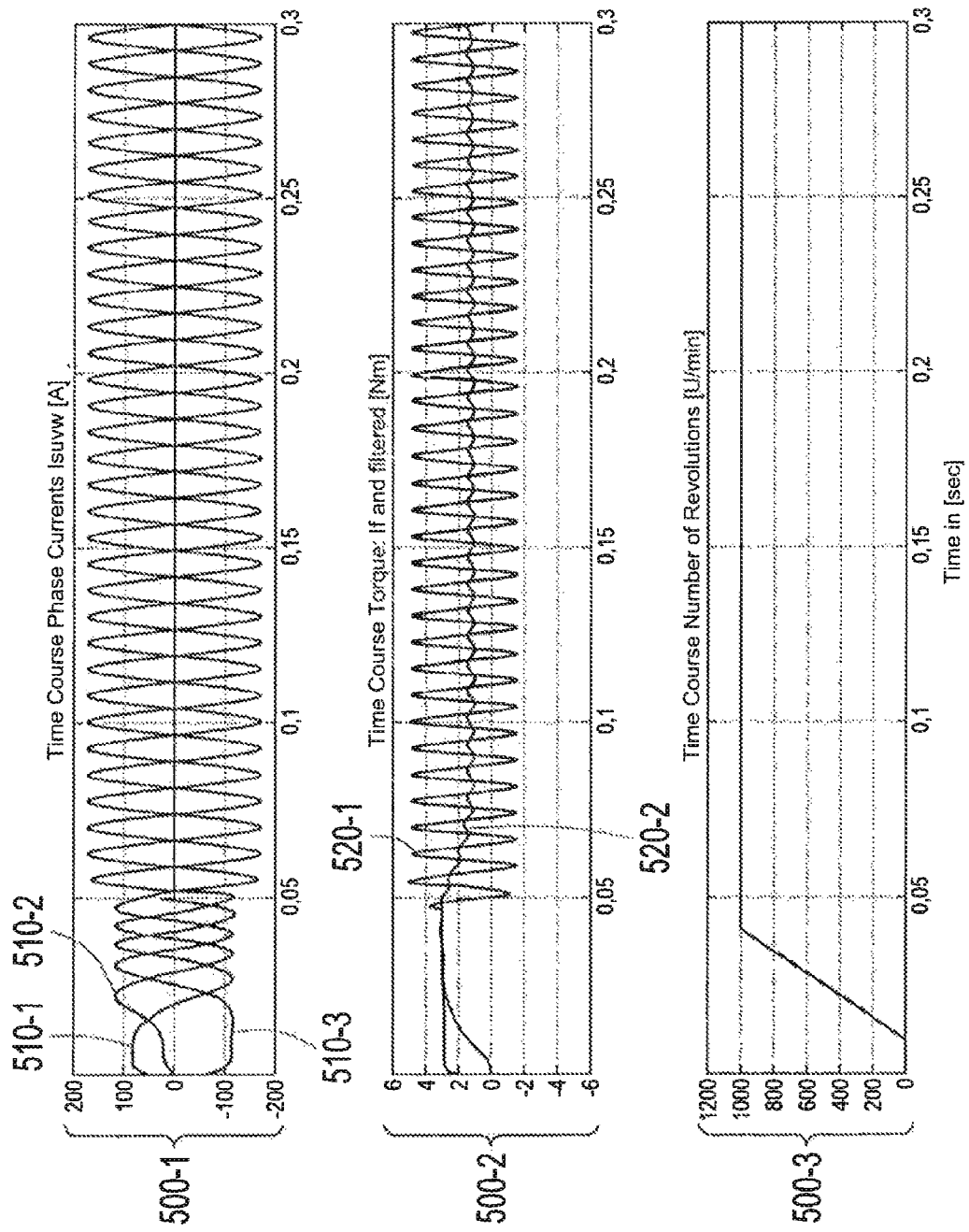
FIG. 5 is a curve of phase currents of three phases, a turning moment and a rotational speed over time upon an interruption of a phase current of the induction machine and with field-oriented control in accordance with a comparative example.

In some operating cases of the machine, as in FIG. 5, the phase currents may be very large, such that the MOSFETs could be destroyed in the remaining two phases. The upper graphic 500-1 shows the chronological curve of the U, V, and W phase currents 510-1 to 510-3, whereas the U phase current 510-1 is interrupted after 0.05 s, and henceforth has a value of 0. Following the interruption, a stronger current can now flow in the two error-free phases V and W, which can lead to an overload of the relevant MOSFETs. Once again explained on the basis of FIG. 2, for example, the MOSFETs 220-1, 220-2, 230-1 and 230-2 may be affected by the overload, if an interruption of the current flow through the MOSFETs 210-1 and 210-2 is present.

The middle graphic 500-2 shows the new curve of an actual value of the turning moment 520-1 following the interruption of a phase. An oscillation occurs from a time of 0.05 seconds; due to the failure of the U phase, the forces controlling for the turning moment no longer act uniformly, and the machine does not run completely smoothly under certain circumstances. Such an imbalance may be reduced, for example through inertia effects, such that the fluctuations could be less pronounced on average over a given time interval. The filtered curve of the turning moment 520-2 illustrates this. However, a rotational speed 530 may remain in place; this is shown in the lower graphic 500-3.

In some applications, the machine may be switched off in such events of error. However, this approach may be undesirable in some applications (such as for a steering system or an electric car, etc.). In order to put the machine in operation upon the event of a failure of the phase interruption, alternative redundancies may be used in the inverter or in the lines of the machine. However, these solutions may bring about additional complexity, additional volume and high costs.

Examples include a processor for controlling an emergency operation of a multiphase induction machine upon an interruption of a first phase current of a first phase of the induction machine. Thereby, the processor is designed to determine a control current setting, corresponding to the emergency operation, for a second phase of the induction machine in a coordinate system fixed to the stator. This occurs through a combination of a first target current setting, corresponding to a normal operation of the electric engine, for the first phase and a second target current setting for the second phase in a coordinate system fixed to the stator. This distinguishes a phase angle and an amplitude of the control current setting for the second phase from a phase angle and an amplitude of the second target current setting. As a result, upon the failure of a phase, the PSM may be controlled in such a manner that an implementation of redundancies in the inverter or the machine may be omitted.

Thereby, the coordinate system fixed to the stator may correspond to the U, V, W coordinate system or the α,β coordinate system from FIG. 2. On the basis of the coordinate systems illustrated in FIG. 1, how a PSM can be controlled upon the failure of a phase is clarified below. Thereby, a redundancy in the inverter or in the machine, or a switching off of the machine, is required. In addition, the machine may continue to be operated with half of the power (or turning moment).

The transformations of the phase currents of the machine in the α,β coordinate system fixed to the stator is initially considered:

$$I_\alpha = \frac{2}{3}\left(I_u - \frac{1}{2}I_v - \frac{1}{2}I_w\right) \qquad \text{GL.1}$$

$$I_\beta = \frac{\sqrt{3}}{2}(I_v - I_w) \qquad \text{GL.2}$$

The reverse transformation from the α,β coordinate system into the U, V, W coordinate system is accordingly:

$$I_u = I_\alpha \qquad \text{GL.3}$$

$$I_v = -\frac{1}{2}I_\alpha + \frac{\sqrt{3}}{2}I_\beta \qquad \text{GL.4}$$

$$I_w = -\frac{1}{2}I_\alpha - \frac{\sqrt{3}}{2}I_\beta \qquad \text{GL.5}$$

This transformation may be undertaken, for example, by means of a converter, similar to the converter 310 schematically shown in FIG. 2.

In the following, in detail, $I_{su}$, $I_{sv}$, $I_{sw}$ currents describe the phase currents of the machine in phase U, V and W, $I_{s\alpha}$, $I_{s\beta}$ describe the components of the current indicator of the machine in the α,β coordinate system and θ describes the electrical angle of the machine, which is equal to the product of a number of pole pairs and the mechanical angle of the rotor.

As the first example, the case in which phase U is interrupted is considered. Thus, the phase current in phase U is equal to zero. If the current in phase U is set to zero, the following currents are obtained:

$$I_{su_1} = I_{s\alpha_1} = 0 \qquad \text{GL.6}$$

$$I_{sv_1} = -\frac{1}{2}I_{s\alpha_1} + \frac{\sqrt{3}}{2}I_{s\beta_1} \qquad \text{GL.7}$$

$$I_{sw_1} = -\frac{1}{2}I_{s\alpha_1} - \frac{\sqrt{3}}{2}I_{s\beta_1} \qquad \text{GL.8}$$

After simplification, the following is obtained:

$$I_{su_1} = I_{s\alpha_1} = 0 \qquad \text{GL.9}$$

$$I_{sv_1} = \frac{\sqrt{3}}{2}I_{s\beta} \qquad \text{GL.10}$$

$$I_{sw_1} = -\frac{\sqrt{3}}{2}I_{s\beta} \qquad \text{GL.11}$$

With GL. 3, 4 and 5, the connection between the case without a phase interruption ($I_{su1}$, $I_{sv}$ and $I_{sw}$) and the case with a phase interruption ($I_{su1}$, $I_{sv1}$ and $I_{sw1}$) is obtained.

$$I_{su_1} = 0 \qquad \text{GL.12}$$

$$I_{sv_1} = -\frac{1}{2}I_{s\alpha} + \frac{\sqrt{3}}{2}I_{s\beta} + \frac{1}{2}I_{s\alpha} \qquad \text{GL.13}$$

$$I_{sw_1} = -\frac{1}{2}I_{s\alpha} - \frac{\sqrt{3}}{2}I_{s\beta} + \frac{1}{2}I_{s\alpha} \qquad \text{GL.14}$$

After simplification, the following is obtained:

$$I_{su_1} = 0 \qquad \text{GL.15}$$

$$I_{sv_1} = I_{sv} + \frac{1}{2}I_{su} \qquad \text{GL.16}$$

$$I_{sw_1} = I_{sw} + \frac{1}{2}I_{su} \qquad \text{GL.17}$$

With GL. 15, 16 and 17, the physical condition that the sum of all three phase currents is equal to zero (node rule) is met.

In other words, the $I_{su}$, $I_{sv}$ and $I_{sw}$ may present target current settings for each of the phases U, V and W, which correspond to a normal operation, thus an error-free operation of the machine. Accordingly, the currents $I_{su1}$, $I_{sv1}$ and $I_{sw1}$ may present control current settings or new target current settings for each of the phases U, V and W, which correspond to a normal operation, thus an operation of the machine after the occurrence of an error (phase interruption).

With some embodiments, each of the control current settings $I_{sv1}$ or $I_{sw1}$ may compensate at least partially for the target current setting $I_{su}$. More precisely, as shown in GL. 16 and 17, the control current setting $I_{sv1}$ or $I_{sw1}$ may correspond to a sum from $I_{sv}$ or $I_{sw}$, and half of $I_{su}$. In additional embodiments with, for example, a machine with more than three phases, this may also be a different value.

Analogous to this, in the event that phase V is interrupted, the new control current values of the phase currents from GL. 18-20 are calculated as follows:

$$I_{Su_1} = I_{Su} + \frac{1}{2} I_{Sv} \qquad \text{GL.18}$$

$$I_{Sv_1} = 0 \qquad \text{GL.19}$$

$$I_{Sw_1} = I_{Sw} + \frac{1}{2} I_{Sv} \qquad \text{GL.20}$$

In the event that phase W is interrupted, the new control current values of the phase currents from GL. 21-23 are obtained as follows:

$$I_{Su_1} = I_{Su} + \frac{1}{2} I_{Sw} \qquad \text{GL.21}$$

$$I_{Sv_1} = I_{Sv} + \frac{1}{2} I_{Sw} \qquad \text{GL.22}$$

$$I_{Sw_1} = 0 \qquad \text{GL.23}$$

Figure 6:
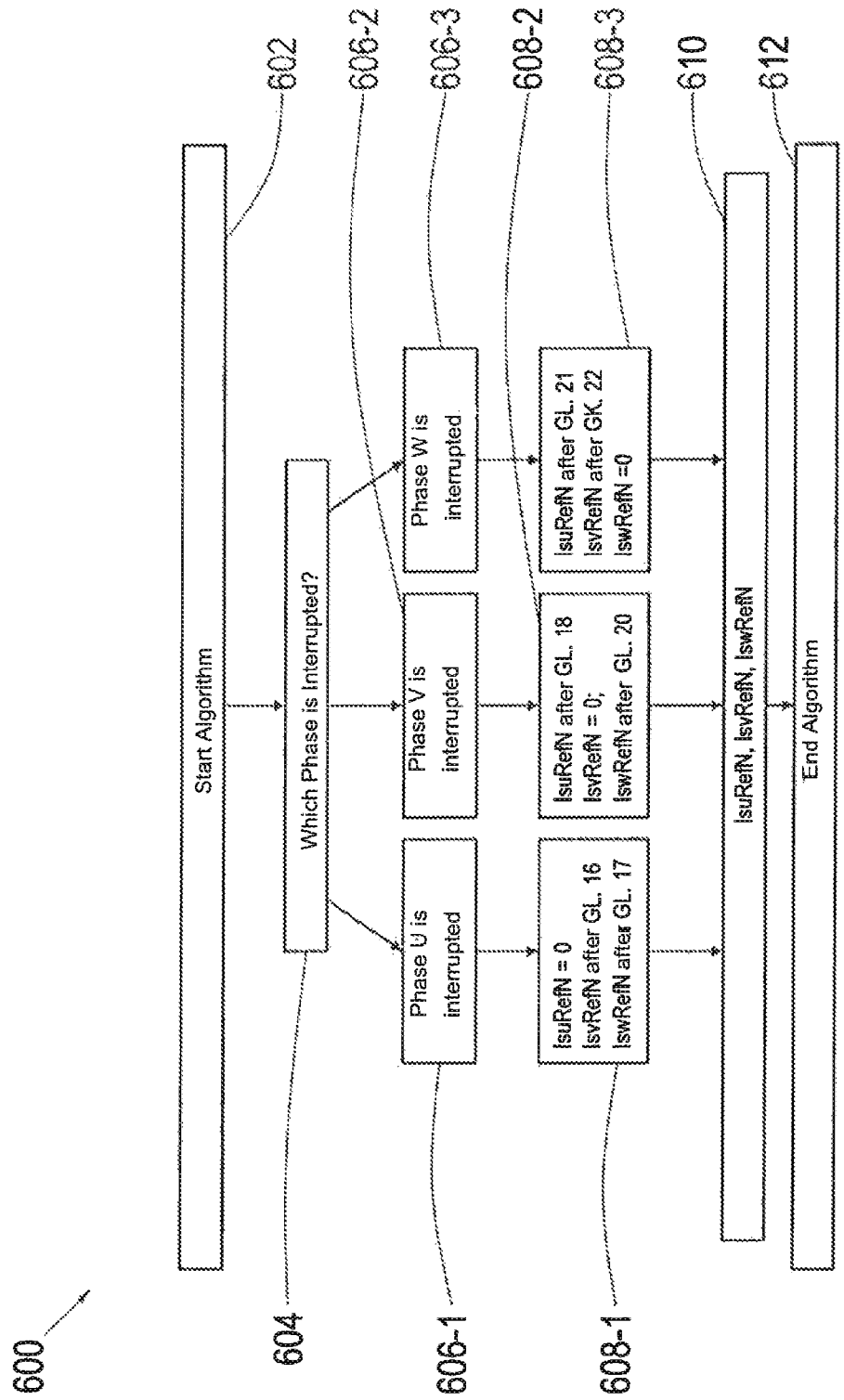
FIG. 6 is a flow diagram for determining the control current settings of the phase currents in accordance with one embodiment.

FIG. 6 shows a flow chart of an algorithm 600, which can be executed, for example, by means of a processor, in order to determine the phase interruption, and adjust the remaining phase currents accordingly. For example, an error signal can be issued by an inverter, by which a start 602 of the algorithm takes place. The error signal may include information 604 regarding which phase is interrupted. Upon an interruption 606-1 of the U phase, a recalculation 608-1 of the control current settings for the three phases according to GL. 15-17 may take place. Analogous to this, upon an interruption 606-2 of the V phase, a recalculation 608-2 of the control current settings for the three phases in accordance with GL. 18-20 may take place, and upon an interruption 606-3 of the W phase, a recalculation 608-3 of the control current settings for the three phases in accordance with GL 21-23 may take place. In each case, the values IsuRefN, IsvRefN and IswRefN described here correspond to the values $I_{su1}$, $I_{sv1}$ and $I_{sw1}$ in the systems of equations. Thereupon, an allocation 610 of the control current setting values IsuRefN, IsvRefN and IswRefN, and a subsequent termination 612 of the algorithm, may take place.

Figure 7:
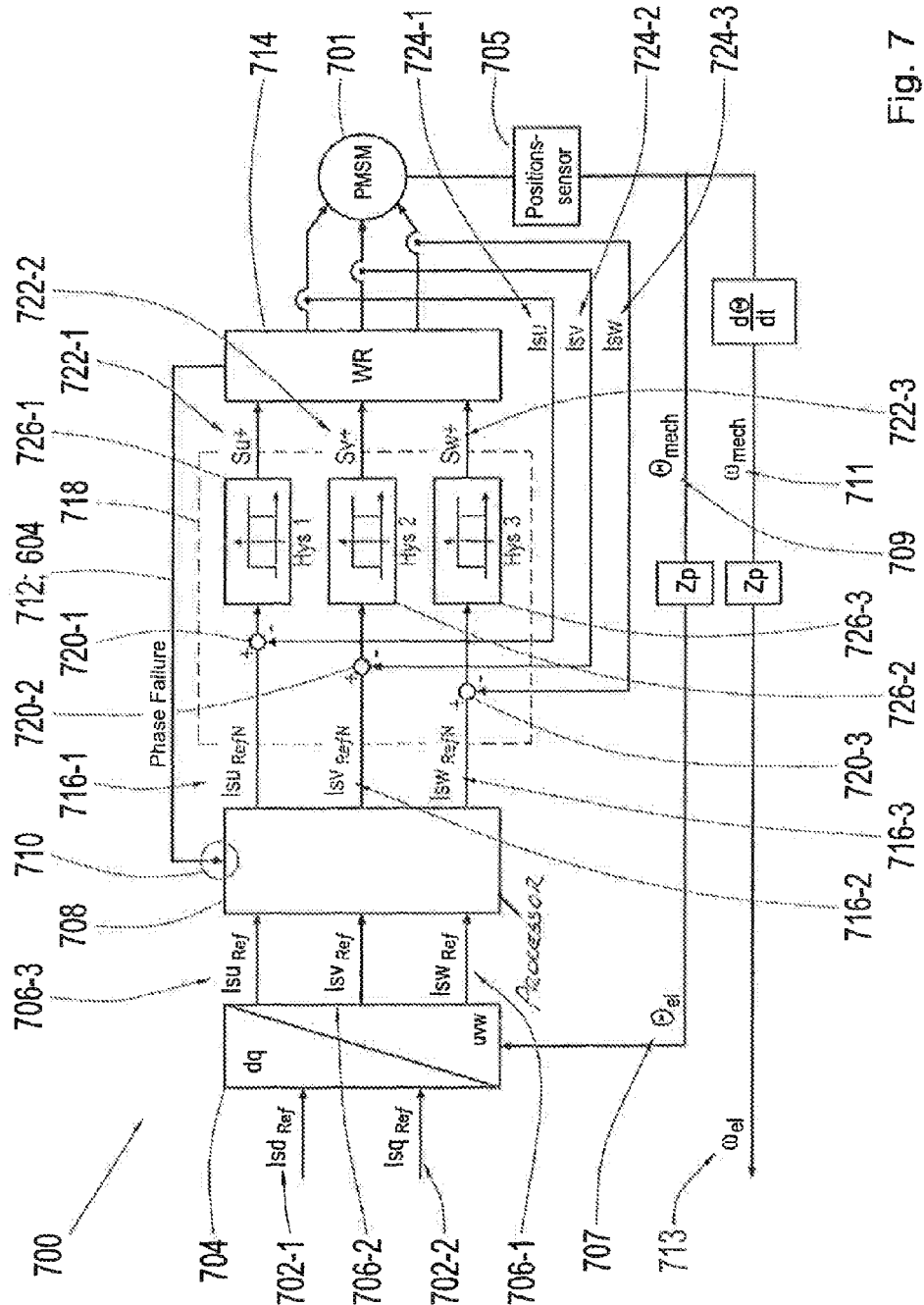
FIG. 7 is a block diagram of a controller of an induction machine through a comparison of the phase currents in accordance with one embodiment.

FIG. 7 shows a block diagram of an installation 700 for controlling ("direct control" may also be spoken of here) of a three-phase induction machine 701 through a comparison of the phase currents in accordance with one embodiment. Initially, two target current values 702-1, 702-2 in the d, q coordinate systems are transferred to the converter 704, which issues three target current values 706-1 to 706-3 in the U, V, W coordinate system. Analogous to FIG. 3, an electrical angle 707 ($\theta_{el}$) may be used for this purpose. For its calculation, a mechanical angle 709 ($\theta_{mech}$) may be provided by a position sensor 705, and multiplied by the number of pole pairs Zp. Furthermore, through the temporal derivation of the mechanical angle 709, the mechanical angular velocity 771 ($\omega_{mech}$), and from this in turn by multiplication with the number of pole pairs Zp, the electrical angular velocity 713 ($\omega_{el}$), can be calculated.

The target current values 706-1 to 706-3 may be provided at a processor 708. In the embodiment shown, the processor features a signal input 710, which is designed for the purpose of receiving an error signal 712 ("phase failure") from a converter 714. Thereby, the error signal 712 includes the information 604 regarding the interrupted phase already specified in connection with FIG. 6. The error signal 712 may be used to monitor the phase interruption error. The information may also be used for the switching of FOR for the control under FIG. 6. Furthermore, the processor 708 is designed to carry out the algorithm 600 described in FIG. 6 in response to the error signal 712, and thereby provide three control current values 716-1 to 716-3.

The installation 700 also includes a device 718 for controlling an emergency operation of a multiphase induction machine 701 upon an interruption of a first phase current of a first phase of the induction machine 701. Indirectly through the processor 708, the device 718 is coupled to the signal input 710, which receives the error signal 712. The device 718 is designed to receive a control current setting 716-1 to 716-3 for a second phase current of a second phase of the induction machine 701 in a coordinate system fixed to the stator. If, for example, U is the interrupted phase, V or W may be the second phase. The device 718 also includes comparators 720-1 to 720-3, which can be assigned to the three phases. The comparators 720-1 to 720-3 are designed to provide a control signal 722-1 to 722-3 at the inverter 714 based on a comparison of the control current setting 716-1 to 716-3 and an actual value 724-1 to 724-3 of the second phase current. The control signal 722-1 to 722-3 brings about, upon a first comparison result, the generation of a first supply voltage value, and, upon a second comparison result, the generation of a second supply voltage value, and thus represents a replacement for a conventional PWM controller.

In other words, in order to achieve a direct control of the phase currents, the control of the machine shown in FIG. 7 is used. Thereby, depending on the interrupted phase, the target values of the phase currents 706-1 to 706-3 can be corrected (see the flow diagram of the algorithm 600 in FIG. 6). Upon the control of the machine in accordance with FIG. 7, the phase current target values IsuRef, IsvRef and IswRef (706-1, 706-2 and 706-3) are calculated from the target values 702-1, 702-2 of the d and q current through transformation by the electrical angle. By means of the algorithm 600 described in FIG. 6, the phase current target values can be corrected to the control current settings IsuRefN, IsvRefN and IswRefN (716-1, 716-2 and 716-3). The correction may serve the purpose of taking into account the phase interruption, so that the desired currents can be adjusted.

The comparison of the control current setting 716-1 to 716-3 and the corresponding actual value 724-1 to 724-3 of a phase may lead to a first or a second comparison result, which in each case could initiate a switching off or switching on of the power semiconductor (such as a MOSFET). These can be reproduced, for example, as digital control signals with the values 0 or 1. The comparison result may depend on whether a difference from the control current setting 716-1 to 716-3 and the corresponding actual value 724-1 to 724-3 is greater than or less than a threshold value. In some embodiments, the threshold may vary, depending on whether the difference is positive or negative. Moreover, the threshold value may depend on whether the first or the second comparison result was last achieved. In other words, the comparison result in a current comparison may follow, depending on the difference for the course of a hysteresis curve. For example, upon the current comparison, the threshold value −a may apply if the comparison result in a last previous comparison step had a result of a control signal with a value of 1, or the threshold value +a may apply if the comparison result previously had a result of a control signal with the value of 0.

Thus, in FIG. 7, initially through the comparators 720-1 to 720-3, the currently flowing phase currents 724-1 to 724-3 are compared with their control current settings 716-1 to 716-3. Accordingly, the control signals Su+, Sv+ und Sw+ (722-1, 722-2 and 722-3) are calculated through the hystereses 726-1 to 726-3. The hystereses 726-1 to 726-3 may be chosen freely as needed (such as the level of the hysteresis and the thresholds of the currents). The control signals Su+, Sv+ und Sw+ may be used to control the upper MOSFETs of the inverter (210-1, 220-1; 230-1 in FIG. 2). For the control of the lower MOSFETs (210-2; 220-2; 230-2 in FIG. 2), the control signals Su−, Sv− und Sw− can be calculated from the control signals Su+, Sv+ and Sw+, for example Su−=NOT(Su+) (i.e., Su+=1 results in Su−=0). In other words, for example, a control signal may bring about a switching on of an upper MOSFET 210-1; 220-1; 230-1 and a simultaneous switching off of a lower MOSFET 210-2; 220-2; 230-2 of the same phase. In doing so, a blocking period between the two complementary MOSFETs in one phase may be considered. Thus, the risk of a short circuit through a simultaneous switching on of an upper and lower MOSFET of the same phase may be avoided.

If a phase is interrupted, it may no longer be controlled through the inverter 714. The current in this phase is equal to zero. For this reason, it may be possible in some embodiments not to take into account the comparator and the control of the MOSFETs in this phase, and even switch them off. Thus, the current in this phase may be forced to be equal to zero, and the machine may already be controlled through direct control of at least the two other phase currents under FIG. 7. Thereby, in the event of an error of a phase interruption, only two comparators and 4 MOSFETs could be in operation, while the third comparator and the two MOSFETs of the interrupted phase could not be taken into account for the control of the machine.

Figure 8:
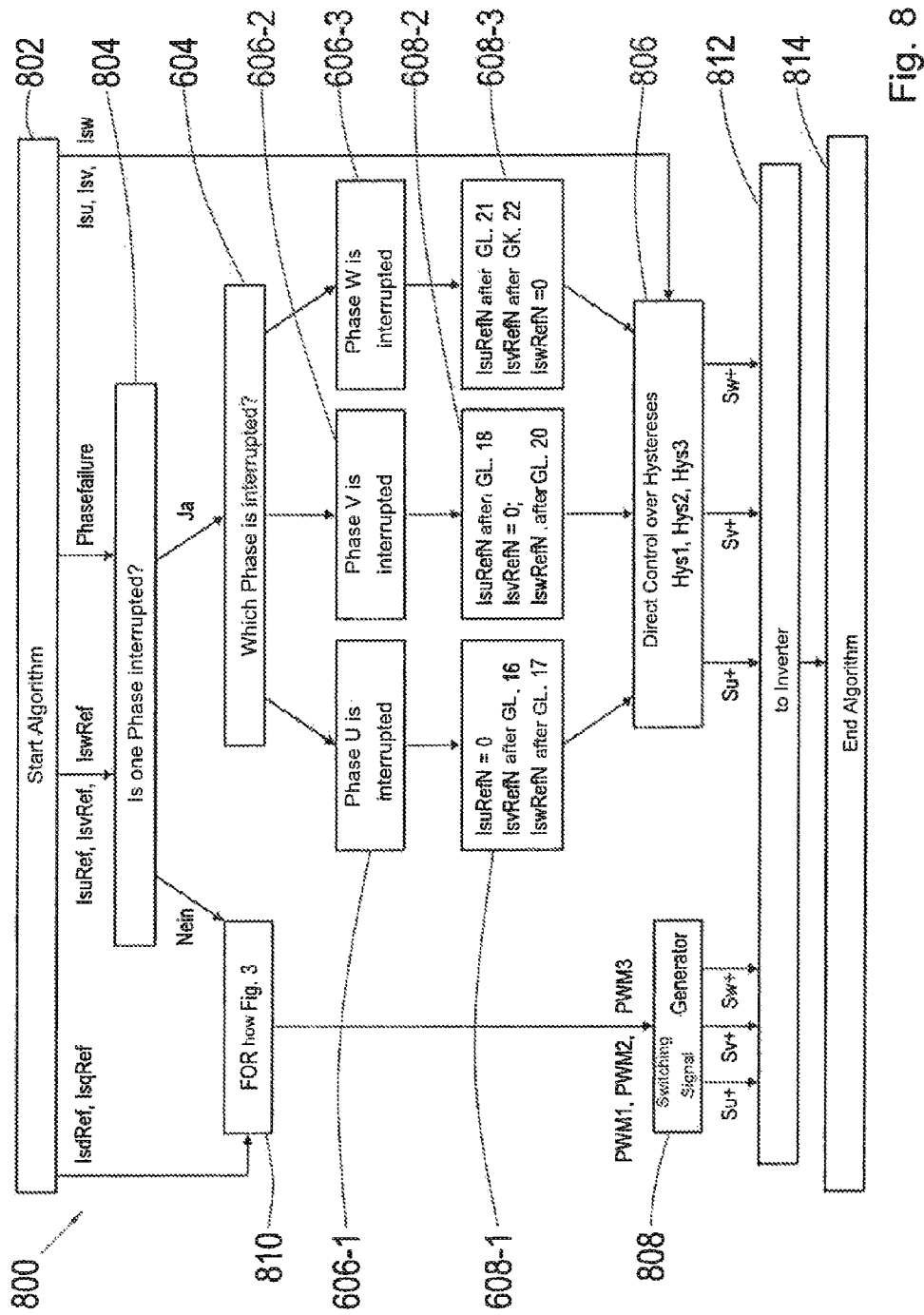
FIG. 8 is a flow diagram for controlling an induction machine, taking into account the event of error of the phase interruption in accordance with one embodiment.

A possible overall sequence of the control 800 of the machine is presented in the flow diagram in FIG. 8 in accordance with one embodiment. Initially, a start 802 of an algorithm, with which a determination 804 takes place through the "phase failure" error signal, takes place if a phase is interrupted. In the normal case, the FOR 810 passes through and, upon a phase interruption, may be switched to the new control under FIG. 7.

More precisely, in the event of an interruption, a further curve by means of the information 604 through the interrupted phase takes place, analogous to the algorithm 600 shown in FIG. 6. With the resulting target current settings IsuRefN, IsvRefN and IswRefN, after a comparison with the actual current values $I_{su}$, $I_{sv}$ and $I_{sw}$, a direct control 806 may be undertaken through the hystereses. Thereupon, the control signals Su+, Sv+ and Sw+ are provided.

If there is no interruption, a FOR 810 may be carried out analogous to the description in FIG. 3. A receipt 808 of the PWM signals already described in FIG. 3 may occur through a shifting signal generator, and the control signals Su+, Sv+ and Sw+ may be provided based on these PWM signals. In both cases, a receipt 812 of the control signals Su+, Sv+ and Sw+ takes place through the inverter, and a follow-up termination 814 of the algorithm.

Alternatively, in normal operation, the machine may also be operated with the control under FIG. 7. Thereby, in normal operation, the algorithm under FIG. 6 may remain disregarded, and taken into account upon a phase interruption. In this case, a switching of the overall control is not necessary.

Figure 9:
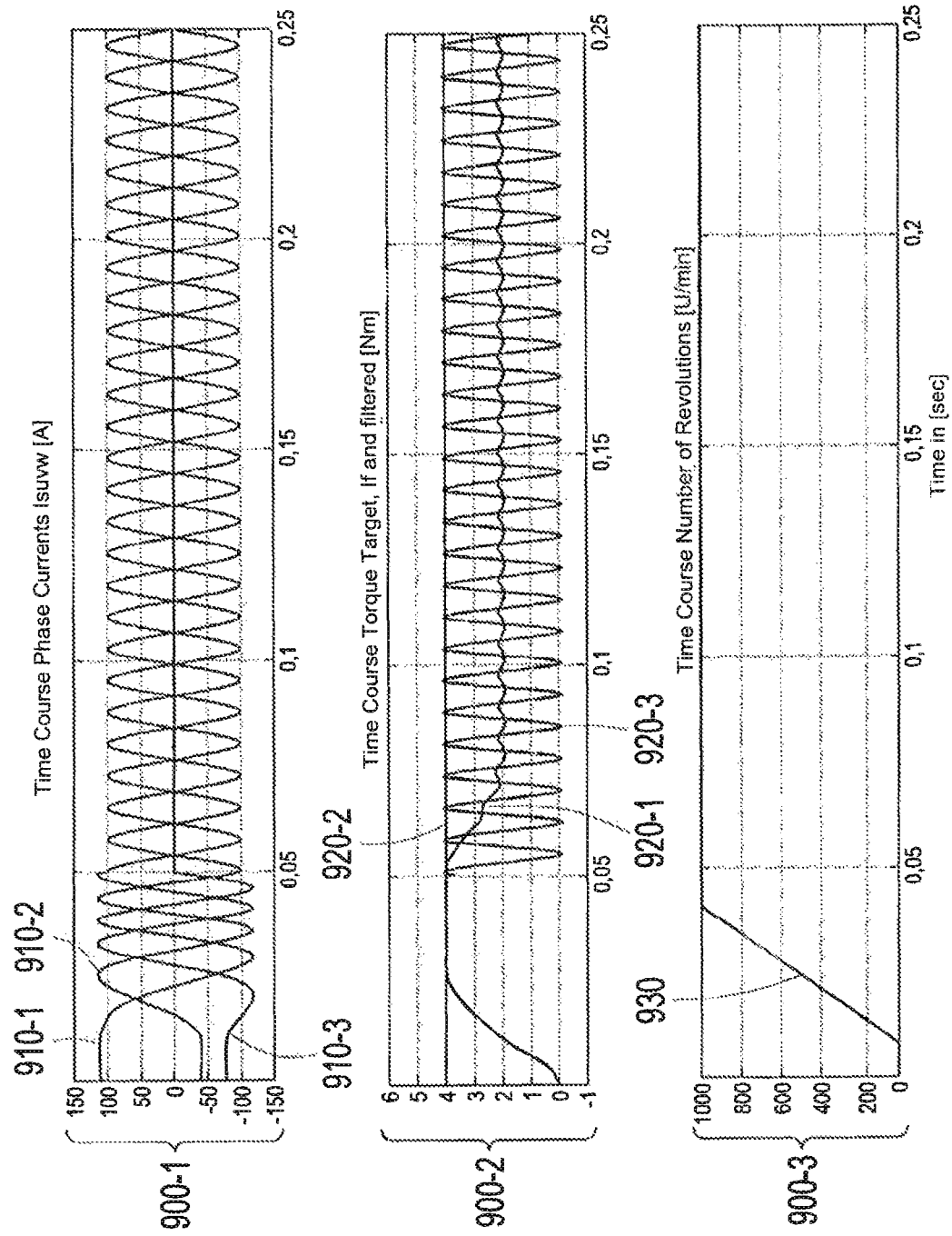
FIG. 9 is a curve of phase currents of three phases, a turning moment and a rotational speed over time upon an interruption of a phase current of the induction machine upon a direct control in accordance with one embodiment.
Figure 10:
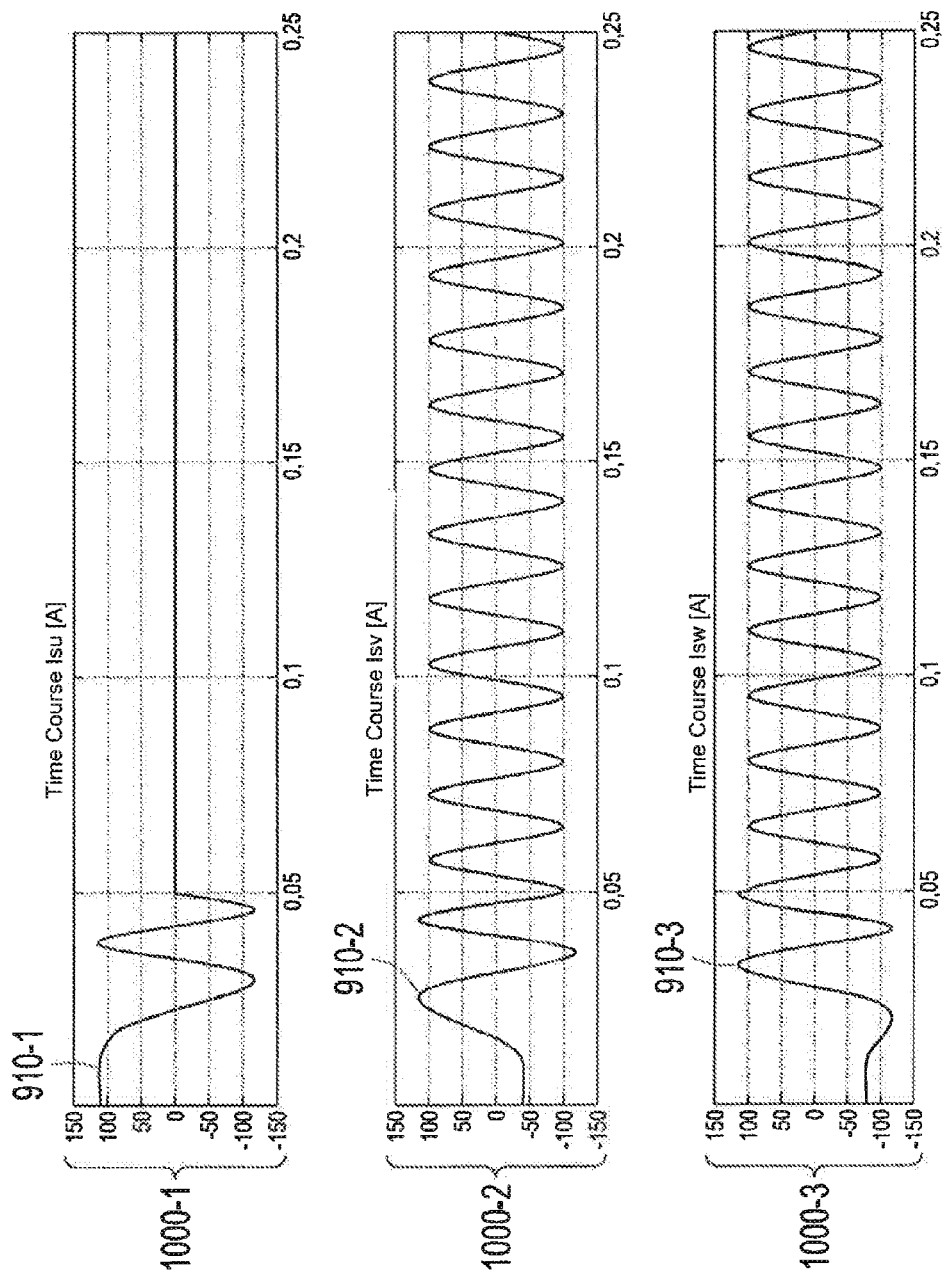
FIG. 10 is a curve of phase currents of three phases in detail over time upon an interruption of a phase current of the induction machine upon a direct control in accordance with one embodiment.

In the following, simulation results are presented with the application of the algorithm from FIG. 6 (or FIG. 8) in accordance with one embodiment. FIGS. 9 and 10 show the event of a phase interruption in U. In normal operation, up to t=0.05 s, the machine is controlled with FOR under FIG. 3. From t=0.05 s, an event of an error of the interruption of phase U is simulated. At this point in time, immediately from the FOR, there is a switch to the control under FIG. 7. Thereby, the algorithm under FIG. 6 is activated.

In the upper graphic 900-1, it can be seen that the phase current 910-1 in phase U through the phase interruption is equal to zero. The target value and the actual value of the two currents Isv and Isw are changed. More precisely, the amplitude and the phasing are changed for the control current settings of the phase currents 910-2 ($I_{sv}$) and 910-3 ($I_{sw}$) in the phases V and W respectively, The new phase difference then amounts to 180° instead of 120°. The sum of the two currents is equal to zero. The middle graphic 900-2 shows that the average value 920-1 of the turning moment, equal to half of the maximum torque. Thereby, similar to FIG. 5, a vibration behavior comes to light with the actual value of the turning moment 920-3. Averaged over time, this may have effects in the respect that the turning moment that effectively arises, with significantly smaller fluctuations, corresponds to approximately half of the target value 920-2. Thus, with the control in the event of a phase interruption, half of the turning moment (or half of the power) can be achieved at the same rotational speed. The lower graphic 900-3 also shows that the rotational speed 930, even after the failure of one phase in the simulation, remains constant at 1000 rpm.

For a better overview, in FIG. 10, the phase currents $I_{sU}$ 910-1, $I_{sV}$ 910-2 and $I_{sW}$ 910-3 are once again represented in separate graphics 1000-1 to 1000-3. The upper graphic 1000-1 shows the phase current $I_{sU}$ 910-1, which receives the value of 0 at t=0.05 s, and remains there. The middle graphic 1000-2 shows the phase current $I_{sV}$ 910-2, and the lower graphic 1000-3 shows the phase current $I_{sW}$ 910-3, which slightly change their amplitudes here at t=0.05 s. With some embodiments, as shown here, the amplitude of a control current setting may be lower then the amplitude of a corresponding target current setting. Their phases are also changed. Through the change to the phases $I_{sV}$ and $I_{sW}$, from t=0.05 s, the phase difference between the two currents amounts to 180° instead of the 120° present prior to the failure of the phase U, such that both currents in sum result in zero.

Similar results are achieved in the event of the interruption of phase V and in the event of the interruption of phase W. In other words, such results essentially correspond to that shown in FIGS. 9 and 10, in terms of both quality and quantity.

Figure 11:
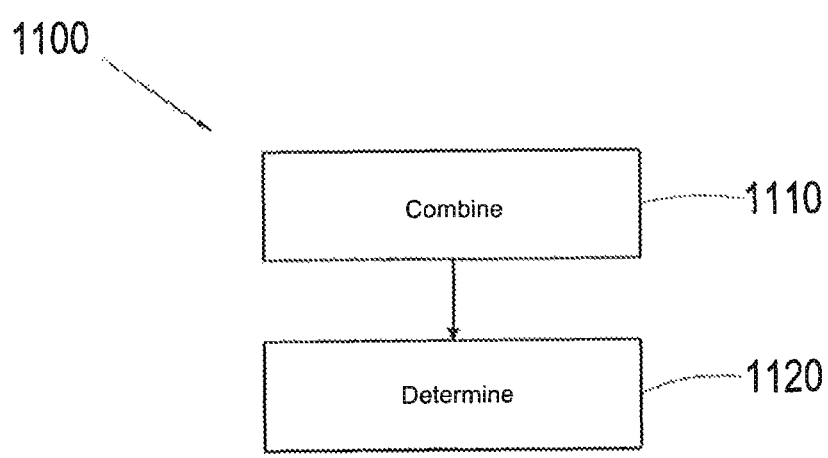
FIG. 11 is a flow chart of a method for controlling an emergency operation of a multiphase induction machine upon an interruption of a phase current in accordance with one embodiment.

FIG. 11 shows a method 1100 in accordance with embodiments for controlling an emergency operation of a multiphase induction machine upon an interruption of a first phase current of a first phase of the induction machine. The method 1100 comprises a combination 1110 of a first target current setting for the first phase, corresponding to a normal operation of the electric engine and a second target current setting for the second phase for the coordinate system fixed to the stator. In addition, the method 1100 comprises a determination 1120 of a control current setting corresponding to the emergency operation for a second phase of the induction machine in a coordinate system fixed to the stator. The determination 1120 takes place through the combination of the first target current setting, corresponding to a normal operation of the electric engine, for the first phase and the second target current setting for the second phase for the coordinate system fixed to the stator. This distinguishes a phase angle and an amplitude of the control current setting for the second phase from a phase angle and an amplitude of the second target current setting.

Once again, stated in other words, embodiments bring about the fact that, with a phase interruption, the machine may continue to be operated with half of the power. This may be helpful, for example, for a steering system or an electric car, for instance for a continued trip to the nearest repair shop. In addition, a simple and direct control of the machine can be achieved. A possible failure of the current sensor in a phase due to a phase interruption can be compensated. Measures such as the emergency switching off upon a phase interruption, which is undesirable for some applications (such as a steering system or an electric car) can be circumvented by embodiments. In addition, the compensation of the phase interruption can be realized without additional expense (such as the implementation of redundancy for phase lines or for an inverter, etc.).

The characteristics disclosed in the above description, the following claims and the attached figures may be of importance and implemented both individually and in any combination for the realization of one embodiment in its various arrangements.

Although some aspects are described in relation to a device, it is understood that such aspects also represent a description of the corresponding method, such that a block or a component of a device is also understood as a corresponding method step or as a characteristic of a method step. Analogous to this, aspects that were described in relation to or as a method step also represent a description of a corresponding block or detail or characteristic of a corresponding device.

Embodiments of the invention may be implemented in hardware or in software, depending on the specific implementation requirements. The implementation may be carried out by using a digital storage medium, such as a floppy disk, a DVD, a Blu-ray Disc, a CD, a ROM, a PROM, an EPROM, an EEPROM or a FLASH storage device, a hard disk or any other magnetic or visual storage device on which electronically readable control signals are stored, which can work together with a programmable hardware component or work together in such a manner that the particular method is carried out.

A programmable hardware component may be formed by a processor, a computer processor (CPU=central processing unit), a graphics processor (GPU=graphics processing unit), a computer, a computer system, an application-specific integrated circuit (ASIC=application-specific integrated circuit), an integrated circuit (IC=integrated circuit), a one-chip system (SOC=system on chip), a programmable logic element or a field-programmable gate array with a microprocessor (FPGA=field programmable gate array).

As such, the digital storage medium may be machine-readable or computer-readable. Some embodiments include a data carrier that features electronically readable control signals, which are able to work together with a programmable computer system or a programmable hardware component in such a manner that one of the methods described herein is carried out. Thus, one embodiment is a data carrier (or a digital storage medium or a computer-readable medium), on which the program for carrying out the method described herein is recorded.

Generally, embodiments of this invention can be implemented as programs, firmware, computer programs or computer program products with a program code, or as data, whereas the program code or the data is or are effective to the effect that one of the methods is to be carried out if the program runs on a processor or a programmable hardware component. The program code or the data may also be stored, for example, on a machine-readable carrier or a data carrier. The program code or the data may also be present as, among other things, source code, machine code or byte code along with any other intermediate code.

An additional embodiment is also a data stream, a signal sequence or a sequence of signals, which present or presents the program or programs for carrying out the method described herein. The data stream, the signal sequence or the sequence of signals may be configured, for example, to the effect that they are transferred through a data communications link, for example, through the Internet or another network. Embodiments are thus signal sequences representing data, which are suitable for a transmission over a network or a data communications link, whereas the data represent the program.

One program in accordance with one embodiment may implement one of its methods during its carrying out, for example, by the fact that it reads storage locations or writes in them a datum or several data, by which, if necessary, shifting operations or other operations are brought about in transistor structures, amplifier structures or in other electrical, optical or magnetic components or components operating according to another functional principle. Accordingly, through the reading of the storage locations, data, values, sensor values or other information may be recorded, determined or measured by a program. As such, through the reading of one or more storage locations, a program may record, determine or measure sizes, values, variables and other information and, through the writing in one or more storage locations, effect, initiate or carry out an action, and control other devices, machines and components.

The embodiments described above represent only a demonstration of the principles of this invention. It is understood that modifications and variations of the arrangements and details described herein will make sense to other specialists. Therefore, it is intended that the invention is limited only by the scope of protection of the following claims, and not by the specific details that were presented herein on the basis of the description and explanation of the embodiments.

The invention claimed is:

1. A processor configured with a multiphase induction machine for controlling an emergency operation of the multiphase induction machine upon an interruption of a first phase current of a first phase of the induction machine, wherein the processor is configured in operative communication with the multiphase induction machine to determine a control current setting during the emergency operation for a second phase of the induction machine in a coordinate system fixed to the stator, the control current setting being a combination of a first target current setting corresponding to a normal operation of the electric engine for the first phase and a second target current setting for the second phase in the coordinate system fixed to the stator in such a manner that a phase angle and an amplitude of the control current setting for the second phase is distinguished from a phase angle and an amplitude of the second target current setting.

2. The processor configured with a multiphase induction machine as in claim 1, whereas the control current setting at least partly compensates for the first target current setting for the first phase.

3. The processor configured with a multiphase induction machine as in claim 1, wherein the control current setting corresponds to a sum of the value of the second target current setting and half of the value of the first target current setting.

4. The processor configured with a multiphase induction machine as in claim 1, wherein an amplitude of the control current setting is less than an amplitude of the second target current setting.

5. The processor configured with a multiphase induction machine as in claim 1, wherein a frequency of the control current setting corresponds to a frequency of the second target current setting, and a rotational speed of the induction machine after the interruption of the first phase current corresponds to the rotational speed of the induction machine prior to the interruption of the first phase current.

6. The processor configured with a multiphase induction machine as in claim 1, further comprising an output interface for a signal with the control current setting, wherein the signal brings about an operation of the induction machine with the control current setting during the emergency operation.

7. A device for control of an emergency operation of a multiphase induction machine upon an interruption of a first phase current of a first phase of the induction machine, the device comprising:
   an input for receipt of a control signal that includes a control current setting for a second phase current of a second phase of the induction machine in a coordinate system fixed to a stator of the induction machine; and
   a comparator that provides a control signal to an inverter based on a comparison of the control current setting and an actual value of the second phase current, wherein a first comparison result generates a first supply voltage value, and a second comparison result generates a second supply voltage value.

8. The device as in claim 7, wherein the first comparison result is obtained if a difference between the control current setting and the actual value of the second phase current is less than a threshold value, and whereas the second comparison result is obtained if a difference between the control current setting and the actual value of the second phase current is greater than the threshold value.

9. The device as in claim 8, wherein the threshold value is a first value if the difference is greater than 0, and a second value if the difference is less than 0.

10. The device as in claim 8, wherein the inverter includes at least one first power semiconductor connected to the second phase of the induction machine and a second power semiconductor connected to the second phase,
    whereas the first comparison result brings about switching on of the first power semiconductor and switching off of the second power semiconductor, and the second comparison result brings about switching off of the first power semiconductor and switching on of the second power semiconductor.

11. The device as in claim 7, further comprising a plurality of the comparators, wherein a first comparator is assigned to the first phase, and a second comparator is assigned to the second phase.

12. The device as in claim 11, wherein the first comparator is deactivated upon a failure of the first phase.

13. A method for controlling an emergency operation of a multiphase induction machine upon an interruption of a first phase current of a first phase of the induction machine, comprising:
    determining a control current setting during the emergency operation for a second phase of the induction machine in a coordinate system fixed to the stator, the control current setting being a combination of a first target current setting corresponding to a normal operation of the electric engine for the first phase and a second target current setting for the second phase in the coordinate system fixed to the stator; and
    wherein a phase angle and an amplitude of the control current setting for the second phase is distinguished from a phase angle and an amplitude of the second target current setting.

14. The method as in claim 13, wherein the method is implemented with a processor configured in communication with the induction machine.

* * * * *